G. M. GUERRANT.
DEVICE FOR PROJECTING THE IMAGES OF TEMPERATURE INDICATORS.
APPLICATION FILED JAN. 22, 1913.
1,074,260.
Patented Sept. 30, 1913.
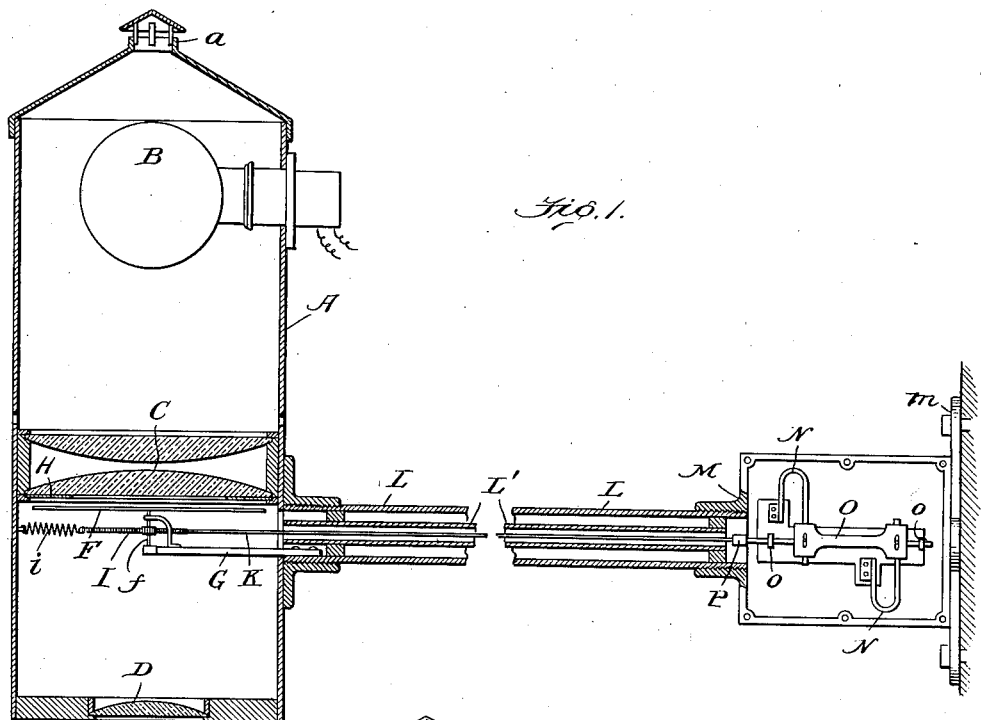
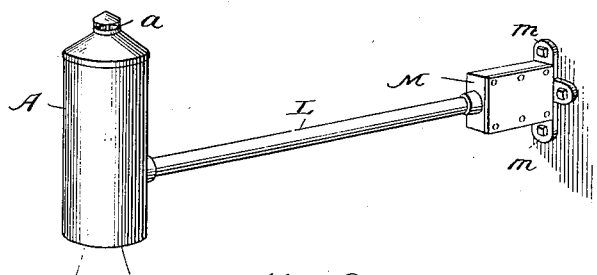
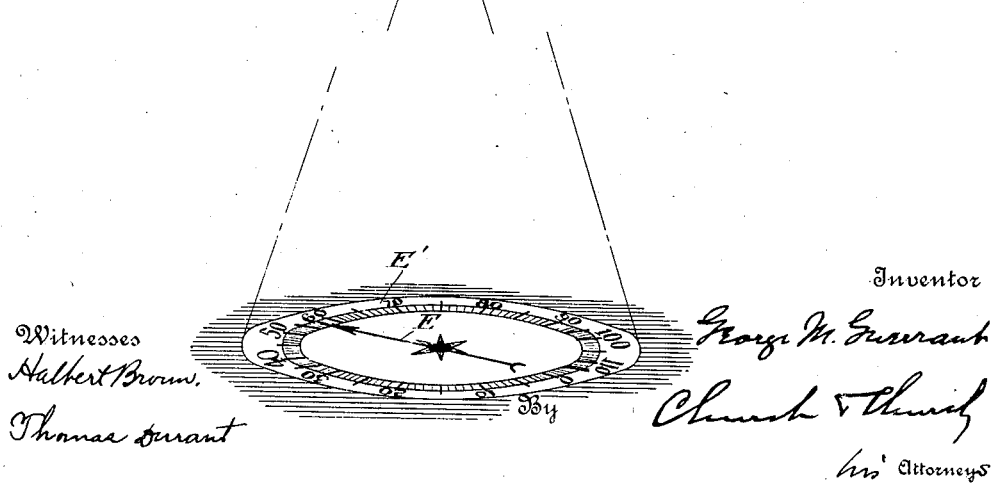

UNITED STATES PATENT OFFICE.

GEORGE M. GUERRANT, OF DANVILLE, VIRGINIA, ASSIGNOR TO HENRY CLARK BRIDGERS, OF TARBORO, NORTH CAROLINA.

DEVICE FOR PROJECTING THE IMAGES OF TEMPERATURE-INDICATORS.

1,074,260. Specification of Letters Patent. Patented Sept. 30, 1913.

Application filed January 22, 1913. Serial No. 743,549.

*To all whom it may concern:*

Be it known that I, GEORGE M. GUERRANT, a citizen of the United States, residing at Danville, in the county of Pittsylvania and State of Virginia, have invented certain new and useful Improvements in Devices for Projecting the Images of Temperature-Indicators; and I do hereby declare the following to be a full, clear, and exact description of the same, reference being had to the accompanying drawings, forming part of this specification, and to the figures and letters of reference marked thereon.

This invention relates to devices primarily intended for attachment to a building, such, for example, as a store front and designed to project therefrom and display on the sidewalk an image of a temperature indicator, whereby the passer-by will be apprised of the prevailing temperature by an indicating means which is of such size that it can be readily observed and which will constitute an attractive feature for advertising purposes.

One of the objects of the invention is to provide a device of small and inconspicuous dimensions, and of such character that it may be readily attached to any available support well above the heads of persons making use of the sidewalk, and which shall embody an image projecting means including a source of illumination, but with the operating devices for the idicator so located with relation to the source of illumination as to be unaffected by the heat therefrom, whereby the indicator may be made to accurately respond to the prevailing temperature of the surrounding atmosphere.

Referring to the accompanying drawings,—Figure 1 is a sectional view through an apparatus embodying the present invention, a portion of the supporting arm being broken away in order that the parts may be represented on a larger scale; Fig. 2 is a perspective view of a complete apparatus and showing diagrammatically the projected image of the temperature indicator.

Like letters of reference in both figures indicate the same parts.

In accordance with the present invention, the projecting means is located in a casing A, which may be of any appropriate or attractive contour, but as shown is a simple cylindrical casing having at the top a ventilator *a* to permit of the escape of air which may be heated by the source of illumination which latter, as illustrated, is an ordinary incandescent electric lamp shown diagrammatically at B. Below the source of illumination B there are mounted in the casing suitable lenses C and D properly arranged for projecting the image of any object placed below the lenses C, it being understood, of course, that the casing is located a proper distance above the sidewalk or other surface upon which the image is to be projected, to insure a proper focusing of the image thereon, as shown for example, in Fig. 2, where the image of the temperature indicating pointer is shown at E and the image of the scale with which the pointer registers at E'.

The temperature indicator consists essentially of a hand or pointer F in Fig. 1, mounted on a spindle *f* journaled in a supporting arm *g* to rotate or move angularly in a horizontal plane immediately below the lens C. Immediately above the pointer or hand F there is arranged an annular scale H preferably formed by opaque graduations and numerals on a transparent base. The hand or pointer F, it will be understood, is also opaque with the result that the image or shadow of the same will be projected as hereinbefore described.

The support G is made of small transverse dimension, whereby its shadow will be insignificant in the projected image, and this is also the case with the operating connections for the hand or pointer. Said operating connections preferably embody a rack and pinion I to one end of which a light spring *i* is secured while the opposite end is connected by a pull or draft rod K with a thermostatic controlling mechanism located at a point remote from the casing and source of illumination so as to be unaffected by the heat therefrom.

The casing is mounted on a tubular supporting arm L and the base of said supporting arm is enlarged to form a chamber for the thermostatic portion of the device, said enlarged base conveniently taking the form of a housing M having a base flange *m* adapted for attachment to the wall or other support for the device. Conveniently the housing M is of rectangular form and enlarged vertically to accommodate U-shaped bi-metallic thermostats N which may be reversely arranged, as shown in Fig. 1, their free ends being provided with connections to a horizontally movable slide O mounted in bearings o in the casing and adapted for attachment to the draft rod K by an adjustable coupling P. The draft rod K is usually a single strand of wire of small gage and it preferably passes freely through a very small tubular lining L' firmly mounted in the tubular arm L. The two tubes L and L' form a rigid arm of small dimension and at the same time any air currents which may be set up will tend to flow through the arm from the thermostatic portion of the device into the casing, thus eliminating any danger of heated air working back into the enlarged base chamber of the arm where it would affect the thermostatic devices and prevent a true indication of the prevailing temperature. The draft rod K, however, is left entirely free so that it will transmit correctly and without interference any movement of the thermostat and the latter will be free to move without friction or resistance other than that occasioned by the spring $i$ and the resistance to the rotation of the hand or pointer.

The device is one which, although embodying an image projecting means and therefore a source of illumination and heat, the thermostatic or operating mechanism which is sensitive to heat, is remote from the source of illumination and heat and is therefore affected only by the prevailing temperature of the surrounding atmosphere. There are no complicated or unusually delicate parts to be disarranged and therefore the device is one which does not require attention except as the source of illumination may have to be renewed or replaced after long continued use.

Having thus described my invention, what I claim as new and desire to secure by Letters Patent of the United States, is:

1. In a device for projecting the image of a temperature indicator, the combination with a casing and a laterally extending tubular arm on which the casing is mounted having a base for attachment to a support, of image projecting means within the casing including a source of illumination and a lens, and a temperature indicator having its indicating portion in the casing in position for its image to be projected and its operating portion extending away from the casing in the tubular arm, whereby it is remote from the heat of the source of illumination.

2. In a device for projecting the image of a temperature indicator, the combination with a casing, a laterally extending tubular arm on which the casing is mounted and a housing forming the base of the arm and adapted for attachment to a support, of image projecting means within the casing including a source of illumination and a lens, and a temperature indicator having its indicating portion in the casing in position to have its image projected and with its operating portion in the base housing of the arm and connected with the indicating portion through the tubular arm, whereby the operating portion is located at a point remote from the source of illumination.

3. In a device for projecting the image of a temperature indicator, the combination with a tubular arm having an enlarged base chamber adapted for attachment to a support, of a casing mounted on the end of said arm, image projecting means within the casing, including a source of illumination and a lens, an angularly movable temperature indicating pointer and a scale with which it registers both located in the casing in position to have their images projected, a thermostat in the enlarged base chamber of the arm, and an operating connection between the thermostat and pointer extending through the arm.

GEORGE M. GUERRANT.

Witnesses:
W. S. WILLIAMS,
E. N. ANDERSON.